US012240635B2

(12) United States Patent
Holmes

(10) Patent No.: US 12,240,635 B2
(45) Date of Patent: Mar. 4, 2025

(54) PHARMACY PACKAGING SYSTEM

(71) Applicant: RXSAFE, LLC, Vista, CA (US)

(72) Inventor: William K. Holmes, San Diego, CA (US)

(73) Assignee: RXSAFE LLC, Vista, CA (US)

( * ) Notice: Subject to any disclaimer, the term of this patent is extended or adjusted under 35 U.S.C. 154(b) by 0 days.

(21) Appl. No.: 18/332,432

(22) Filed: Jun. 9, 2023

(65) Prior Publication Data

US 2023/0331410 A1 Oct. 19, 2023

Related U.S. Application Data

(63) Continuation of application No. 16/544,150, filed on Aug. 19, 2019, now Pat. No. 11,724,837, which is a (Continued)

(51) Int. Cl.
*B65B 1/04* (2006.01)
*B65B 1/02* (2006.01)
(Continued)

(52) U.S. Cl.
CPC .................. *B65B 1/02* (2013.01); *B65B 9/02* (2013.01); *G07F 11/165* (2013.01); *G07F 11/44* (2013.01);
(Continued)

(58) Field of Classification Search
CPC ........... B65B 5/103; B65B 39/00; B65B 1/04; G07F 17/0092
See application file for complete search history.

(56) References Cited

U.S. PATENT DOCUMENTS 2,208,951 A 7/1940 Tamassy
2,960,808 A 11/1960 Pike
(Continued)

FOREIGN PATENT DOCUMENTS

EP 0947425 A1 10/1999
EP 1707490 A2 10/2006
(Continued)

*Primary Examiner* — Gloria R Weeks
(74) *Attorney, Agent, or Firm* — Michael Best & Friedrich LLP

(57) ABSTRACT

A packaging unit and method for packaging pharmaceuticals into pouches. The packaging unit includes a dispensing area to receive cassettes that contain pharmaceuticals and packaging equipment in communication with the dispensing area. The packaging unit also includes a control system coupled to the packaging equipment to control operation of the packaging equipment and a chute connecting the dispensing area to the packaging equipment. The chute includes a plurality of tracks, each track corresponding to one of the cassettes supported on the dispensing area. The packaging unit includes a receptacle supported by the packaging equipment between the chute and a feed stock roll. The plurality of tracks converge to direct the pharmaceuticals that are dispensed from the cassettes into the receptacle and the receptacle directs the pharmaceuticals received from the plurality of tracks as a group into the pouches formed by the feed stock roll.

20 Claims, 16 Drawing Sheets

Related U.S. Application Data continuation of application No. 13/836,629, filed on Mar. 15, 2013, now Pat. No. 10,427,809.

(60) Provisional application No. 61/654,365, filed on Jun. 1, 2012.

(51) Int. Cl.

| | |
|---|---|
| ***B65B 9/02*** | (2006.01) |
| ***B65B 39/00*** | (2006.01) |
| ***G07F 11/16*** | (2006.01) |
| ***G07F 11/44*** | (2006.01) |
| ***G07F 11/60*** | (2006.01) |
| ***G07F 17/00*** | (2006.01) |

(52) U.S. Cl.

CPC .......... *G07F 11/60* (2013.01); *G07F 17/0092* (2013.01); *B65B 2039/009* (2013.01)

(56) References Cited

U.S. PATENT DOCUMENTS

| | | | |
|---|---|---|---|
| 3,439,469 A | 4/1969 | Van Mil, Jr. | |
| 3,552,087 A | 1/1971 | Schneider et al. | |
| 4,067,173 A | 1/1978 | Borrello | |
| 4,493,178 A | 1/1985 | Buckner et al. | |
| 4,546,901 A | 10/1985 | Buttarazzi | |
| 4,655,026 A | 4/1987 | Wigoda | |
| 4,703,765 A | 11/1987 | Paules et al. | |
| 4,761,932 A | 8/1988 | Harvey et al. | |
| 5,029,430 A | 7/1991 | Davis | |
| 5,097,652 A | 3/1992 | Inamura et al. | |
| 5,219,095 A | 6/1993 | Shimizu et al. | |
| 5,348,061 A | 9/1994 | Riley et al. | |
| 5,463,839 A | 11/1995 | Stange et al. | |
| 5,481,855 A | 1/1996 | Yuyama | |
| 5,694,741 A | 12/1997 | Weder et al. | |
| 5,716,114 A | 2/1998 | Holmes et al. | |
| 5,765,606 A | 6/1998 | Takemasa et al. | |
| 5,819,500 A | 10/1998 | Haraguchi et al. | |
| 5,946,883 A | 9/1999 | Yuyama et al. | |
| 6,012,602 A | 1/2000 | Yuyama et al. | |
| 6,036,812 A | 3/2000 | Williams et al. | |
| 6,050,064 A * | 4/2000 | Yuyama | B26D 3/30 53/514 |
| 6,119,737 A | 9/2000 | Yuyama et al. | |
| 6,170,230 B1 | 1/2001 | Chudy et al. | |
| 6,170,699 B1 | 1/2001 | Kim | |
| 6,256,967 B1 | 7/2001 | Hebron et al. | |
| 6,324,253 B1 | 11/2001 | Yuyama et al. | |
| 6,481,180 B1 | 11/2002 | Takahasghi et al. | |
| 6,478,041 B1 | 12/2002 | Stede | |
| 6,505,457 B2 | 1/2003 | Grass | |
| 6,519,914 B1 | 2/2003 | Pesho | |
| 6,581,355 B1 | 6/2003 | Yuyama et al. | |
| 6,598,368 B1 | 7/2003 | Haida | |
| 6,772,907 B2 | 8/2004 | Kim | |
| 7,028,447 B2 | 4/2006 | Sung | |
| 7,100,792 B2 | 9/2006 | Hunter et al. | |
| 7,118,006 B2 | 10/2006 | Williams et al. | |
| 7,124,791 B2 * | 10/2006 | Geltser | B65B 57/20 141/105 |
| 7,182,105 B1 | 2/2007 | Feehan et al. | |
| 7,383,862 B2 * | 6/2008 | Geltser | B65B 5/103 141/2 |
| 7,386,970 B2 * | 6/2008 | Richwine | B01L 3/0241 53/247 |
| 7,428,805 B2 | 9/2008 | Kim | |
| 7,536,938 B2 | 5/2009 | Kim | |
| 7,549,268 B2 | 6/2009 | Kim | |
| 7,562,791 B2 | 7/2009 | Silverbrook et al. | |
| 7,637,078 B2 | 12/2009 | Ishlwatari et al. | |
| 7,818,947 B2 | 10/2010 | Kim | |
| 7,856,794 B2 | 12/2010 | Zieher | |
| 7,878,366 B2 | 2/2011 | Cicognani | |
| 7,886,508 B2 | 2/2011 | Yuyama et al. | |
| 7,894,656 B2 | 2/2011 | Kim | |
| 8,096,100 B2 | 1/2012 | Greenwald et al. | |
| 8,122,689 B2 | 2/2012 | Pape | |
| 8,146,777 B2 | 4/2012 | Inamura | |
| 8,186,542 B2 | 5/2012 | Kobayashi et al. | |
| 8,234,838 B2 | 8/2012 | Yasunaga | |
| 8,627,639 B2 | 1/2014 | Ali et al. | |
| 8,678,231 B2 | 3/2014 | Yuyama et al. | |
| 8,794,273 B2 | 8/2014 | Ansaloni et al. | |
| 8,896,322 B2 | 11/2014 | Rivenbark, Jr. | |
| 9,272,796 B1 | 3/2016 | Chudy | |
| 10,315,785 B2 | 6/2019 | Rea et al. | |
| 10,427,809 B2 | 10/2019 | Holmes | |
| 10,427,810 B2 | 10/2019 | Holmes | |
| 10,696,437 B2 | 6/2020 | Persson | |
| 10,722,430 B1 | 7/2020 | Arora | |
| 2003/0056467 A1 | 3/2003 | Kim | |
| 2003/0057231 A1 | 3/2003 | Kim | |
| 2003/0188517 A1 | 10/2003 | Paradissis et al. | |
| 2006/0259195 A1 | 11/2006 | Eliuk et al. | |
| 2007/0151204 A1 | 7/2007 | Kim | |
| 2007/0186514 A1 | 8/2007 | Vollm et al. | |
| 2008/0307757 A1 * | 12/2008 | Heim | B65G 27/34 53/500 |
| 2009/0205291 A1 | 8/2009 | Antonevich et al. | |
| 2009/0255948 A1 | 10/2009 | Bassani | |
| 2009/0272758 A1 | 11/2009 | Karwacki, Jr. et al. | |
| 2009/0308964 A1 | 12/2009 | Chudy et al. | |
| 2010/0011715 A1 | 1/2010 | Freudelsperger | |
| 2010/0042255 A1 | 2/2010 | Boutin | |
| 2010/0050570 A1 | 3/2010 | Mori et al. | |
| 2010/0059069 A1 | 3/2010 | Boldrini | |
| 2010/0071320 A1 | 3/2010 | Ali et al. | |
| 2010/0071711 A1 | 3/2010 | Boldrini | |
| 2010/0077707 A1 | 4/2010 | Kondo et al. | |
| 2010/0077708 A1 | 4/2010 | Kobayashi et al. | |
| 2010/0115892 A1 | 5/2010 | Aylward et al. | |
| 2010/0168910 A1 | 7/2010 | Haas | |
| 2010/0287880 A1 | 11/2010 | Yasunaga et al. | |
| 2011/0054668 A1 | 3/2011 | Holmes et al. | |
| 2012/0096807 A1 | 4/2012 | Okuma | |
| 2013/0299381 A9 | 11/2013 | Luciano, Jr. | |
| 2013/0318915 A1 | 12/2013 | Iskarous et al. | |
| 2014/0245697 A1 | 9/2014 | Omura et al. | |
| 2014/0298754 A1 | 10/2014 | Van Wijngaarden | |
| 2014/0318078 A1 | 10/2014 | Kondo et al. | |
| 2017/0057682 A1 | 3/2017 | Chudy | |
| 2017/0305589 A1 | 10/2017 | Yuyama et al. | |
| 2018/0318167 A1 | 11/2018 | Luciano, Jr. et al. | |
| 2020/0317382 A1 | 10/2020 | Savoie-Lavigueur et al. | |
| 2020/0331641 A1 | 10/2020 | Yuyuma | |

FOREIGN PATENT DOCUMENTS

| | | |
|---|---|---|
| EP | 1728718 A1 | 12/2006 |
| JP | H11206854 A | 8/1999 |
| JP | 2005053538 A | 3/2005 |
| JP | 2006321516 A | 11/2006 |
| JP | 2007084073 A | 4/2007 |
| JP | 2014118166 A | 6/2014 |
| JP | 2014230744 A | 12/2014 |
| JP | 2018027345 A | 2/2018 |
| WO | 9929467 A2 | 6/1999 |
| WO | 2010077797 A1 | 7/2010 |
| WO | 2011055037 A2 | 5/2011 |

* cited by examiner

PHARMACY PACKAGING SYSTEM

CROSS-REFERENCE TO RELATED APPLICATIONS

This application is a continuation of U.S. patent application Ser. No. 16/544,150, filed on Aug. 19, 2019, which is a continuation of U.S. patent application Ser. No. 13/836,629, filed Mar. 15, 2013, now U.S. Pat. No. 10,427,809, which claims priority to U.S. Provisional Patent Application No. 61/654,365, filed Jun. 1, 2012, the entire contents of which is incorporated by reference herein.

FIELD OF THE INVENTION

The present invention relates to packaging systems and, more particularly, to systems for storing, retrieving, and packaging pharmaceuticals.

SUMMARY

In one embodiment, the invention provides a system for storing and packaging pharmaceuticals. The system includes a frame configured to store cassettes that contain pharmaceuticals and a cassette-moving assembly coupled to the frame. The cassette-moving assembly is operable to move relative to the frame to retrieve the cassettes from the frame. The system also includes a dispensing area positioned adjacent the frame to receive the cassettes from the cassette-moving assembly. The dispensing area is operable to selectively open the cassettes. The system further includes packaging equipment in communication with the dispensing area. The packaging equipment includes a feed stock roll for forming pouches. The packaging equipment is operable to fill the pouches with pharmaceuticals that are dispensed from the cassettes in the dispensing area. The system also includes a control system coupled to the cassette-moving assembly and the packaging equipment to control operation of the cassette-moving assembly and the packaging equipment.

In another embodiment, the invention provides a system for storing and retrieving pharmaceuticals. The system includes a storage unit having a frame configured to store cassettes that contain pharmaceuticals and a cassette-moving assembly coupled to the frame. The cassette-moving assembly is operable to move relative to the frame to retrieve the cassettes from the frame. The system also includes a packaging unit having a dispensing area positioned adjacent the frame of the storage unit to receive the cassettes from the cassette-moving assembly. The dispensing area is operable to selectively open the cassettes. The packaging unit also has packaging equipment operable to package pharmaceuticals that are dispensed from the cassettes in the dispensing area and a chute extending from the dispensing area to direct pharmaceuticals that are dispensed from the cassettes toward the packaging equipment.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
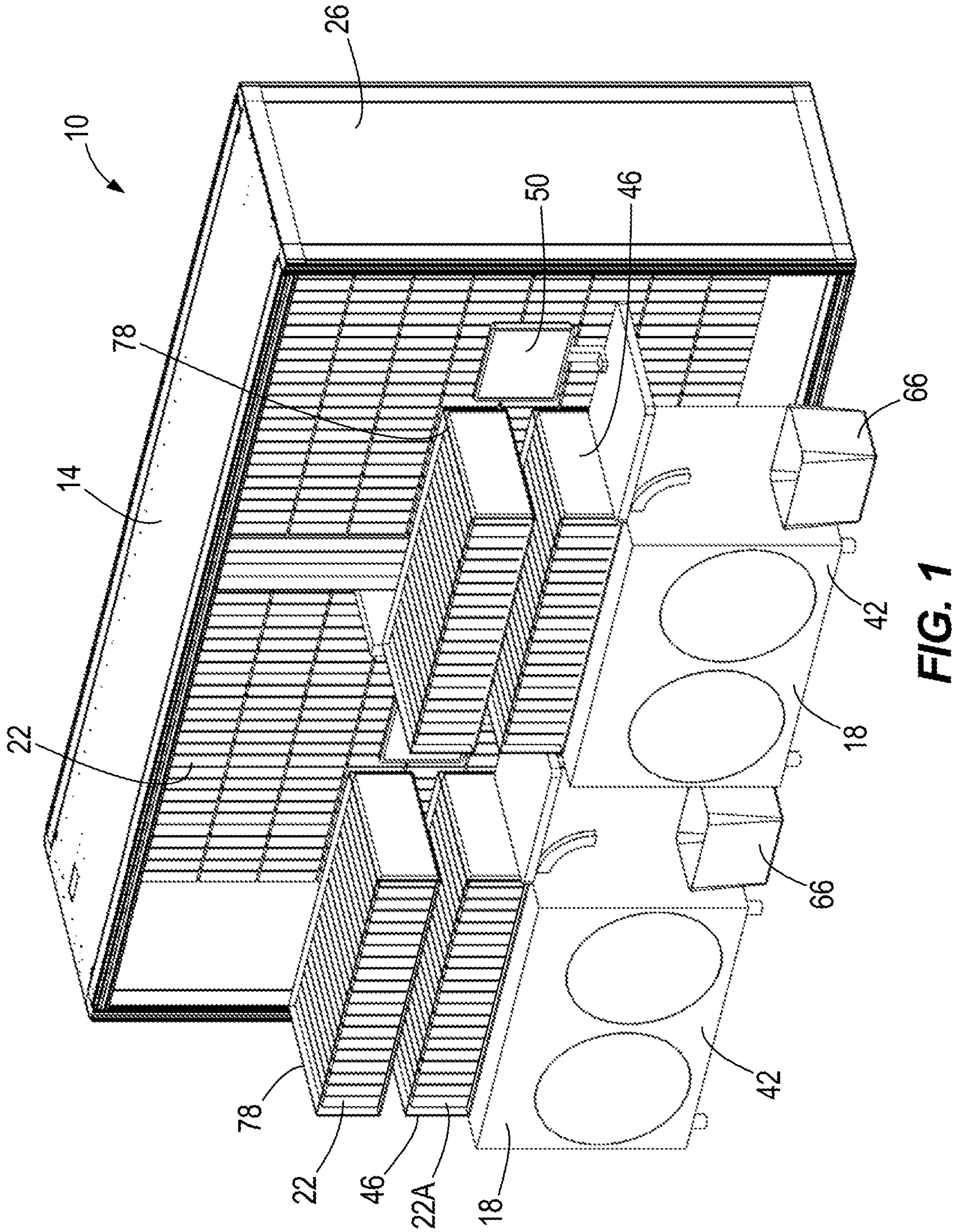
FIG. 1 is a perspective view of a pharmacy packaging system according to one embodiment of the invention.
Figure 2:
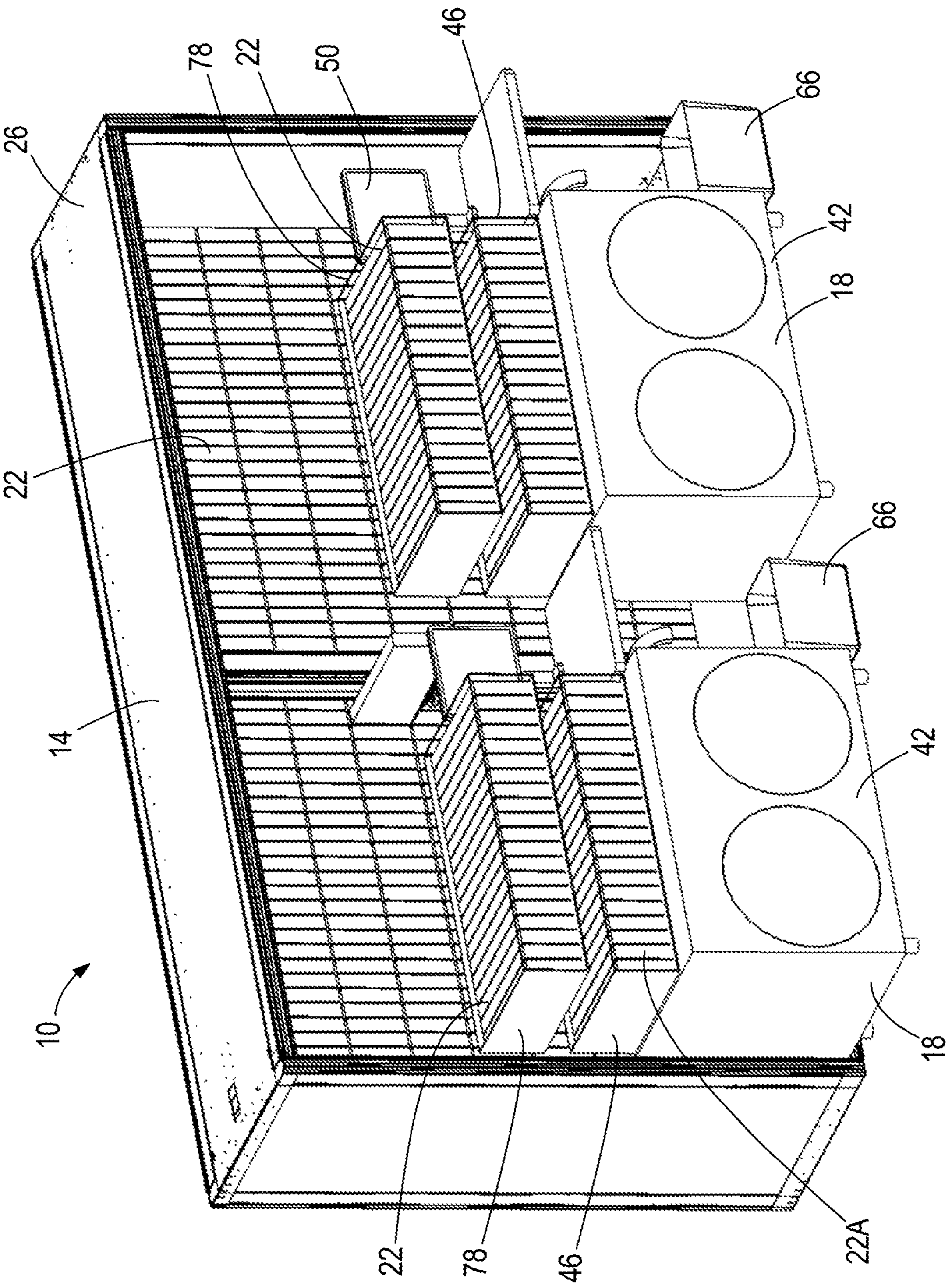
FIG. 2 is another perspective view of the pharmacy packaging system shown in FIG. 1.

FIGS. 1 and 2 illustrate a pharmacy packaging system 10 embodying the invention. The illustrated system 10 is a self-contained system that stores, retrieves, and packages pharmaceuticals (e.g., pills, drugs, narcotics, or other medications). The system 10 securely stores all of the pharmaceuticals required by a facility in an organized manner. In addition, the system 10 allows a user to retrieve different combinations of those pharmaceuticals through an automated process. In some embodiments, the system 10 can be placed in a facility (e.g., a closed-door pharmacy) that supplies packaged pharmaceuticals to multiple locations. In other embodiments, the system 10 can be placed in a consumer pharmacy or in other locations where a variety of different pharmaceuticals are distributed directly to multiple patients on a regular basis, such as in a nursing home, a hospital, a correctional facility, a home residence, or the like.

In the illustrated embodiment, the system 10 includes a storage unit 14 and two automatic packaging units 18. The storage unit 14 stores a plurality of cassettes 22, or containers or canisters, containing a variety of pharmaceuticals. The packaging units 18 package pharmaceuticals from those cassettes 22 into pouches for distribution to patients. In some embodiments, the system 10 may include fewer or more packaging units 18. Additionally or alternatively, the packaging units 18 may be positioned on both sides of the storage unit 14. For example, the system 10 may include four packaging units 18, with two units 18 positioned on each side of the storage unit 14. Such an arrangement allows multiple, independent packaging units 18 to access the same pharmaceutical array.

Figure 3:
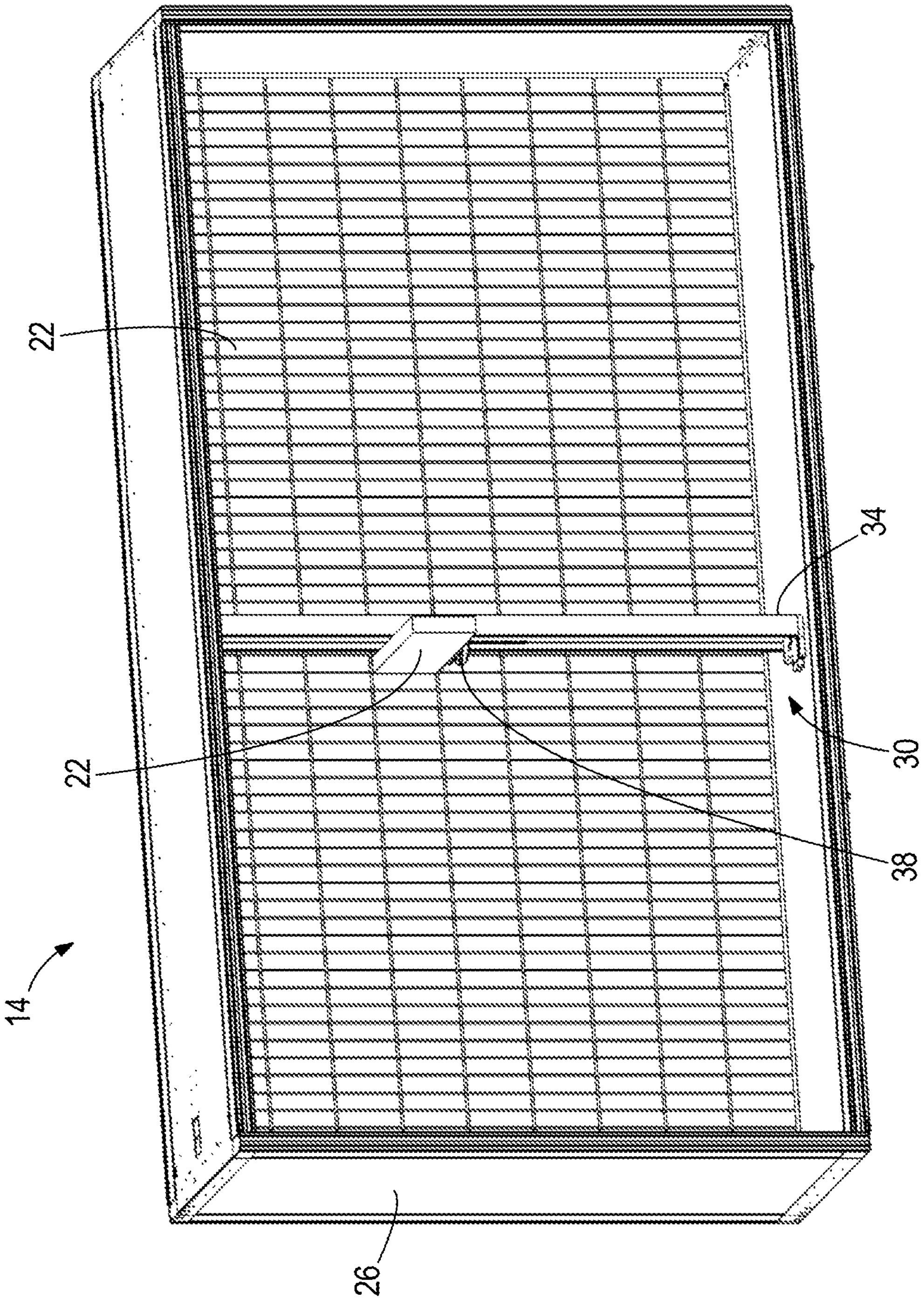
FIG. 3 is a perspective view of a storage unit of the pharmacy packaging system shown in FIG. 1.

As shown in FIG. 3, the storage unit 14 includes a frame 26 and a gantry assembly 30. The frame 26 includes a plurality of shelves or other supports for storing the cassettes 22 in an array of rows and columns. Each cassette 22 is uniformly shaped and sized and can contain a different pharmaceutical. In some embodiments, the frame 26 may be, for example, about fourteen feet wide by six feet tall by four feet deep and may store up to 1000 individual cassettes 22. In other embodiments, the frame 26 may be larger or smaller for storing fewer or more cassettes 22, as needed by a particular facility.

The gantry assembly 30 is coupled to the frame 26 for retrieving cassettes 22 from within the frame 26. The gantry assembly 30 is a cassette-moving assembly that is operable to move the cassettes 22 within the frame 26. The illustrated gantry assembly 30 is similar to the gantry assembly disclosed in U.S. patent application Ser. No. 12/870,045, filed Aug. 27, 2010 and published as U.S. Patent Application Publication No. 2011/0054668, the entire contents of which are incorporated by reference herein. The gantry assembly 30 includes a track 34 and a robotic head 38 that is operable to move along the track 34 to retrieve the cassettes 22. The track 34 is movable horizontally within the frame 26 to align the robotic head 38 with a specific column of cassettes 22. The robotic head 38, or carriage assembly, is movable vertically along the track 34 to align with a specific row of cassettes 22. When the robotic head 38 is aligned with the desired cassette 22, the head 38 grabs the cassette 22 and carries the cassette 22 to one of the automatic packaging units 18, as further described below. The robotic head 38 can also retrieve a cassette 22 from the packaging unit 18 and return the cassette 22 to the proper column and row within the frame 26.

Figure 4:
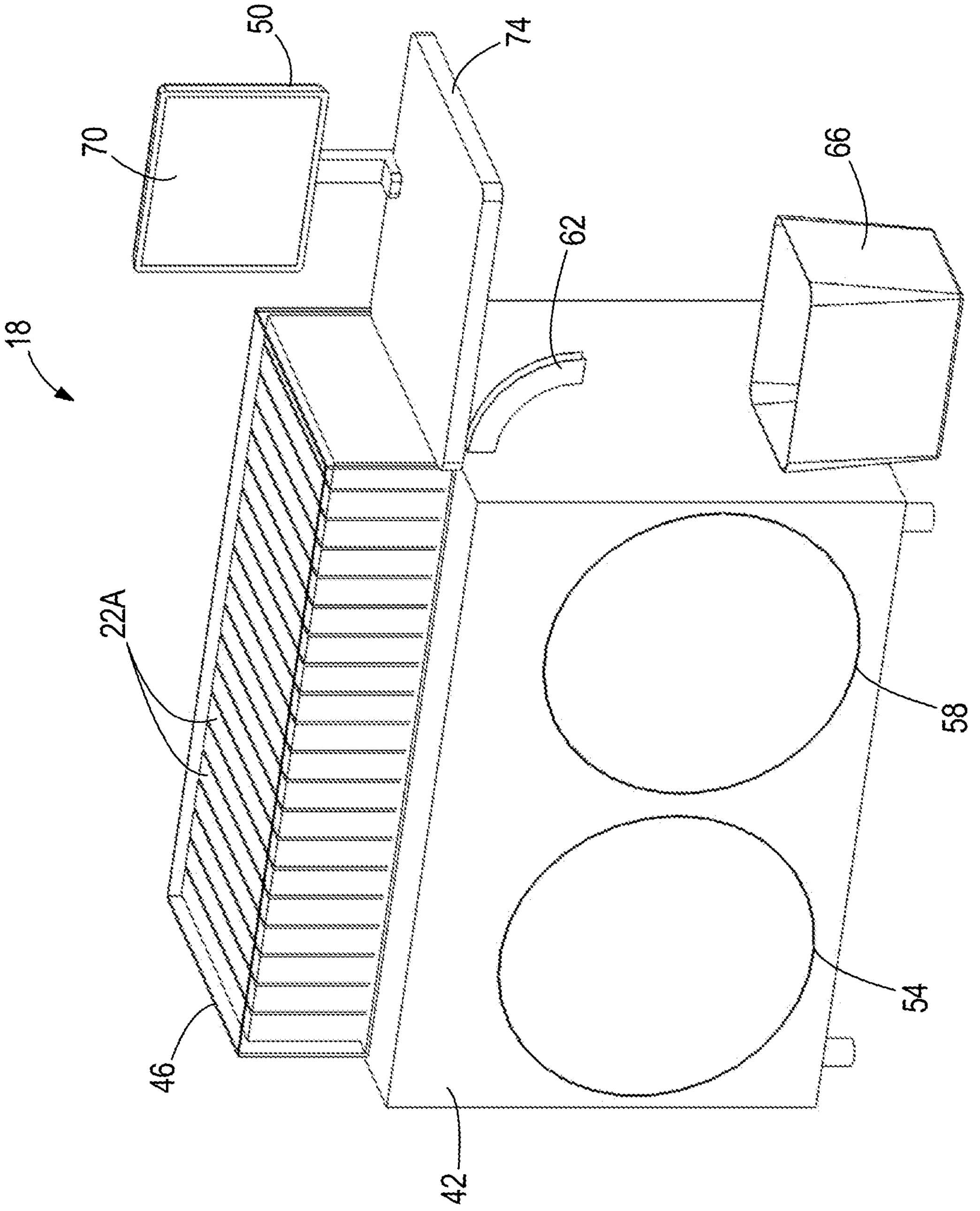
FIG. 4 is a perspective view of an automatic packaging unit of the pharmacy packaging system shown in FIG. 1.

FIG. 4 illustrates one of the automatic packaging units 18. The packaging unit 18 includes a cabinet 42, a dispensing area 46, and a control system 50. The illustrated cabinet 42 may be about two feet deep such that the entire system 10 is about six feet deep. The cabinet 42 contains equipment for packaging pharmaceuticals into pouches. In the illustrated embodiment, the packaging equipment includes a feed stock roll 54 and a take-up roll 58 that are positioned within the cabinet 42. The feed stock roll 54 unrolls the pouches, which are then filled with pharmaceuticals from the cassettes 22A in the dispensing area 46. The pouch is run along a track underneath all of the active cassettes 22A and filled with the requested number and type of pharmaceuticals from the appropriate cassettes 22A. Such an arrangement reduces the possibility of cross-contamination between the cassettes 22A and, thereby, the pharmaceuticals. Once a pouch is filled, the pouch is discharged from the cabinet 42 through an outlet 62. In the illustrated embodiment, the outlet 62 drops the filled pouches into a tote 66 so the pouches can be retrieved by a user. In other embodiments, the packaging equipment may be configured to package the pharmaceuticals into blister packs, pharmacy vials, or other suitable containers.

In some embodiments, the packaging units 18 may include rollers, castors, or other types of wheels. The wheels allow a user to roll the packaging units 18 toward and away from the storage unit 14 in a modular fashion. Such an arrangement provides redundancy by allowing each of the units 18 to quickly and easily be replaced. In addition, the packaging units 18 may be interchanged if pharmaceuticals need to be packaged in a different size and/or type of container.

The illustrated dispensing area 46 is positioned on top of the cabinet 42 adjacent the frame 26 of the storage unit 14. The dispensing area 46 temporarily stores a series of active cassettes 22A that are used to fill the pouches within the cabinet 42. In the illustrated embodiment, the dispensing area 46 stores up to twenty active cassettes 22A at a time. Such an arrangement allows a pouch to be filled with twenty different pharmaceuticals. In other embodiments, the dispensing area 46 may store fewer or more active cassettes 22A. The illustrated dispensing area 46 includes motors and sensors that are temporarily connected to each of the active cassettes 22A. For example, one motor and one sensor may electrically connect to each active cassette 22A to selectively open and close the cassette 22A and to monitor the amount (e.g., number, volume, etc.) of pharmaceuticals being dispensed from the cassette 22A. When open, the cassettes 22A drop pharmaceuticals into the pouches. In the illustrated embodiment, the pharmaceuticals are dispensed from the cassettes 22A via gravity. In other embodiments, the packaging equipment may generate a vacuum to draw the pharmaceuticals out of the cassettes 22A. Metering devices may also be coupled to each active cassette 22A to help control the amount of pharmaceuticals being dispensed.

In some embodiments, the automatic packaging unit 18 may include an inspection device that inspects the pharmaceuticals before they are packaged in the pouches. After the pharmaceuticals come out of the active cassettes 22A, the pharmaceuticals may be temporarily collected in an intermediate catch basin. A sensor (e.g., a camera, etc.) may inspect the pharmaceuticals in the basin based on, for example, color, shape, infrared images, shape recognition, or pill imprints. The sensor may alternatively inspect the pharmaceuticals with spectrography, magnetic resonance, or the like. Once the pharmaceuticals are verified, the pharmaceuticals can be released from the basin into the corresponding pouch. Inspection of the pharmaceuticals may be entirely automated or may involve a person (e.g., a remote operator who views images of the pharmaceuticals).

The control system 50 is electrically coupled to the packaging equipment and the gantry assembly 30 to control operation of the packaging system 10. In particular, the control system 50 coordinates movement of the gantry assembly 30 to move the cassettes 22 between the storage unit 14 and the packaging unit 18, controls operation of the feed stock roll 54 to release a pouch, and controls when the active cassettes 22A positioned in the dispensing area 46 are opened and closed. The illustrated control system 50 includes a monitor 70 mounted to a shelf 74 that extends from the cabinet 42. The control system 50 may also include a processor, a memory, and an input device (e.g., a keyboard) that allows a user to interface with the system 50. In some embodiments, the monitor 70 may include a touch screen.

Referring back to FIGS. 1 and 2, during operation, a user interacts with the packaging system 10 through the control systems 50 on the packaging units 18. The user may input the name of a patient and/or a particular combination of pharmaceuticals needed. Once the necessary data is inputted, the gantry assembly 30 moves relative to the frame 26 to retrieve the proper cassettes 22 from the storage unit 14 and carry the cassettes 22 to the dispensing area 46. In the illustrated embodiment, the robotic head 38 of the gantry assembly 30 carries one cassette 22 at a time, but alternates between carrying a cassette 22 to the dispensing area 46 and removing a cassette 22 from the dispensing area 46, thereby limiting excess movements of the gantry assembly 30. In some embodiments, a user interacts with the packaging system 10 via a remote device (e.g., a tablet, smart phone, laptop, or client computer) that enables the user to remotely control or otherwise interact with the packaging system 10.

After the proper cassettes 22 are positioned in the dispensing area, the packaging equipment within the cabinet 42 fills a pouch with the desired pharmaceuticals. For example, a single pouch may be filled with a week's supply of assorted pharmaceuticals for a particular patient. By connecting two packaging units 18 to the storage unit 14, a user (or multiple users) can simultaneously input data and fill two pouches with pharmaceuticals for different patients. In some embodiments, the packaging equipment may include a printer to print a patient's name, the date, the amount and type of pharmaceuticals contained within, a bar code, or other indicia on the pouches. Once a pouch is filled and labeled, the pouch is dropped into the corresponding tote 66.

As the pouches are being filled, the control system 50 tracks and monitors the amount and types of pharmaceuticals within the system 10. For example, the control system 50 can verify that a user is authorized to retrieve certain pharmaceuticals, that a patient has a prescription for a particular pharmaceutical, and the quantity of pharmaceuticals remaining in each cassette 22. The control system 50 can also track where a particular cassette of pharmaceuticals is positioned within the system 10 (i.e., whether the cassette 22 is currently stored in the storage unit 14 or one of the dispensing areas 46, and in which row and column of the frame 26 the cassette 22 belongs).

In some embodiments, the filling of orders can be optimized by the control system 50. For example, a user can input all of the orders that need to be filled by the system 10 in a given day. The control system 10 can then determine in which order to process those orders to minimize the number of times the cassettes 22 move between the storage unit 14 and the dispensing areas 46 of the packaging units 18. In other embodiments, the control system 50 may optimize the orders such that all of the orders for a particular patient or facility are filled consecutively. In further embodiments, the user may program the control system 50 so that a particular order is filled immediately and/or the orders are filled in the order in which they were requested.

In still further embodiments, the control system 50 can be programmed to fill a spool of pouches with the same drug or other pharmaceutical. For example, the control system 50 can fill a series of 50 to 500 pouches with an individual drug or narcotic for pharmacies, nursing homes, hospitals, or other facilities to keep as stock drugs in emergency drug kits.

As shown in FIGS. 1 and 2, the packaging system 10 also includes two refill areas 78 positioned above the dispensing areas 46 of the packaging units 18. In other embodiments, the system 10 may only include a single refill area and/or the refill areas 78 may be positioned in different locations relative to the packaging units 18. The refill areas 78 may be manually stocked with cassettes 22 by a user. When one of the cassettes 22 stored within the storage unit 14 is depleted, the gantry assembly 30 can remove the empty cassette, place that cassette in the refill area 78, and grab a replacement cassette from the refill area 78. The gantry assembly 30 can then position the replacement cassette in the proper row and column within the frame 26. In some embodiments, the control system 50 can alert a user when a particular cassette 22 is empty or near empty so that the user can place a suitable replacement cassette 22 within the refill area 78 and input information notifying the system 50 of the replacement cassette 22.

The illustrated packaging system 10 increases the speed at which pouches of pharmaceuticals can be filled at an on-site facility and reduces the possibility of errors when filling those pouches. In the illustrated embodiment, the system 10 can achieve a throughput of up to ninety pouches per minute, including verification, for each automatic packaging unit 18 included in the system 10. The automated system 10 also avoids cross-contamination caused by mixing pharmaceuticals between pouches.

In some embodiments, the automatic packaging units 18 may operate separately from the storage unit 14. In such embodiments, each packaging unit 18 may be a standalone packaging system for use in smaller pharmacies or other low-volume facilities. In addition, the dispensing areas 46 of the packaging units 18 may be manually stocked, as needed, to fill specific pharmaceutical orders.

Figure 7:
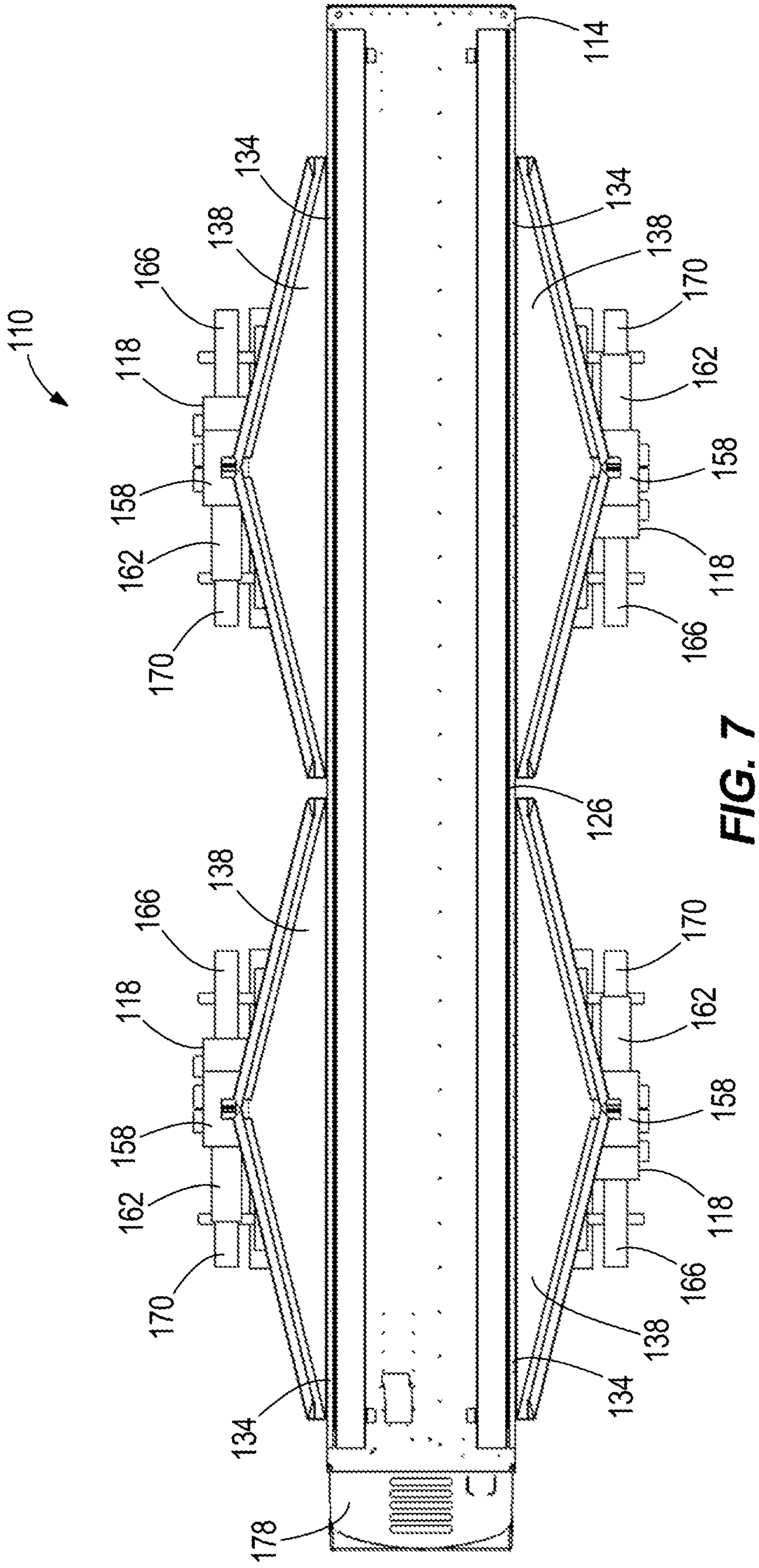
FIG. 7 is a top view of the pharmacy packaging system shown in FIG. 5.

FIGS. 5-9 illustrate a pharmacy packaging system 110 according to another embodiment of the invention. Similar to the packaging system 10 discussed above with reference to FIGS. 1-4, the illustrated packaging system 110 includes a storage unit 114 and multiple automatic packaging units 118. As shown in FIG. 7, the packaging system 110 includes four packaging units 118, with two units 118 positioned adjacent each side of the storage unit 114 to access cassettes 122. In other embodiments, the packaging system 110 may include fewer or more packaging units 118.

Referring back to FIGS. 5 and 6, the storage unit 114 includes a frame 126 and a gantry assembly 130. The frame 126 includes a plurality of shelves for storing the cassettes 122 in an array of rows and columns. In some embodiments, panels may be coupled to and extend across the frame 126 to enclose the frame 126 such that the cassettes 122 are secured within the system 110. The illustrated cassettes 122 are non-motorized canisters suitable for storing pharmaceuticals. The gantry assembly 130, or cassette-moving assembly, is similar to the gantry assembly 30 discussed above and can move along the frame 126 to retrieve the cassettes 122. In the illustrated embodiment, the gantry assembly 130 is positioned between two arrays, or stacks, of cassettes 122 such that the gantry assembly 130 can access the cassettes 122 on both sides of the storage unit 114.

Each packaging unit 114 includes a motor base 134 positioned adjacent the frame 126 of the storage unit 114 and a chute 138 coupled to and extending from the motor base 134. The motor bases 134 are offset from the other shelves of the frame 126 and include ledges 142 for supporting active cassettes 122A. The illustrated motor bases 134 are only offset from the other shelves a relatively short distance to reduce the range of horizontal movement required by the gantry assembly 130 to place cassettes 122 on or remove cassettes 122 from the ledges 142. In the illustrated embodiment, each motor base 134 supports up to twenty active cassettes 122A at a time in a single, horizontal row. In other embodiments, each motor base 134 may support fewer or more active cassettes 122A and/or the motor bases 134 may be configured to support the active cassettes 122A in multiple rows (e.g., two rows of ten, three rows of seven, etc.). Each motor base 134 includes one or more motors operable to open the active cassettes 122A to dispense the pharmaceuticals stored within the cassettes 122A. The motor bases 134 thereby provide dispensing areas for the active cassettes 122A.

Figure 5:
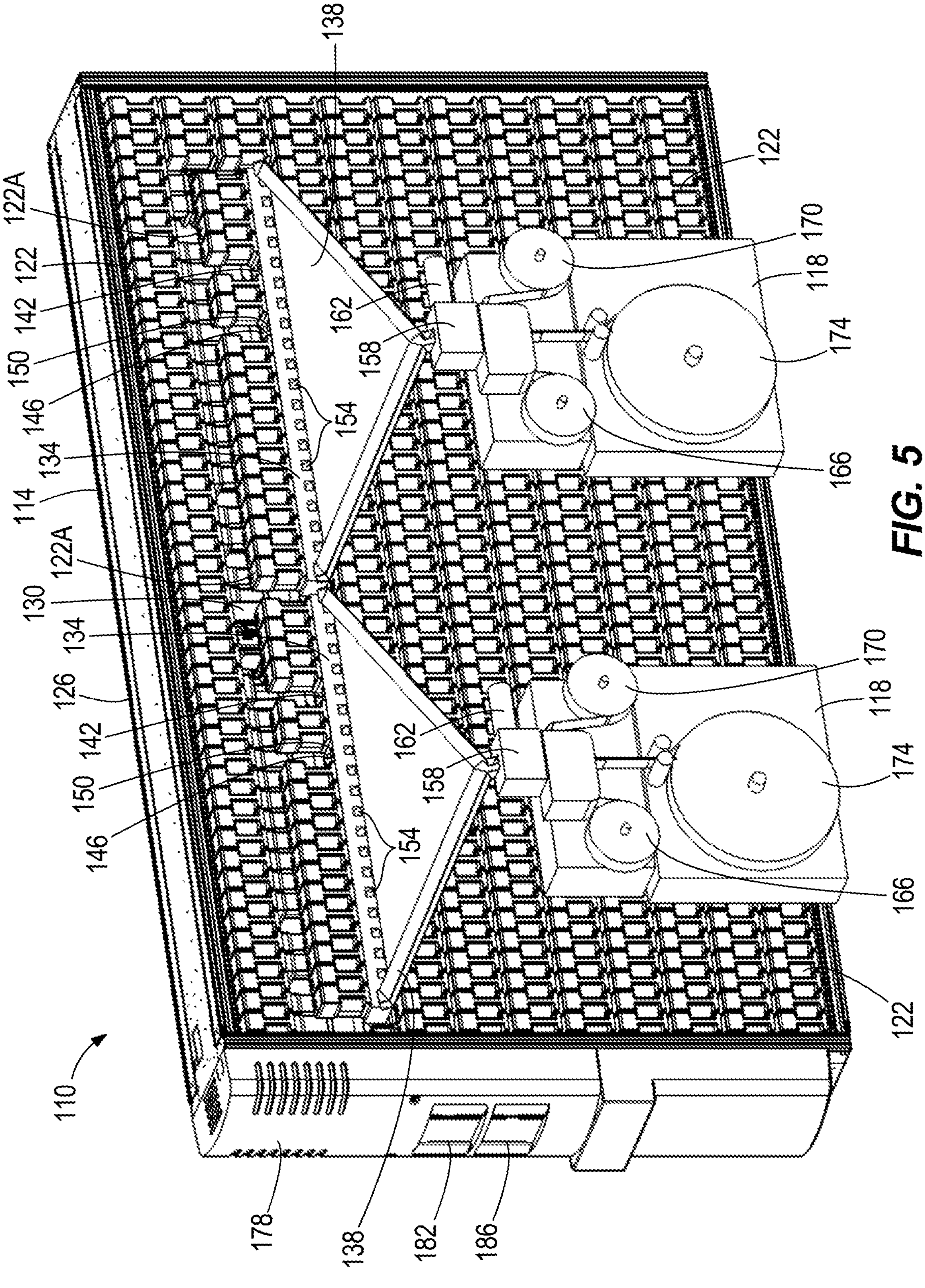
FIG. 5 is a perspective view of a pharmacy packaging system according to another embodiment of the invention.
Figure 6:
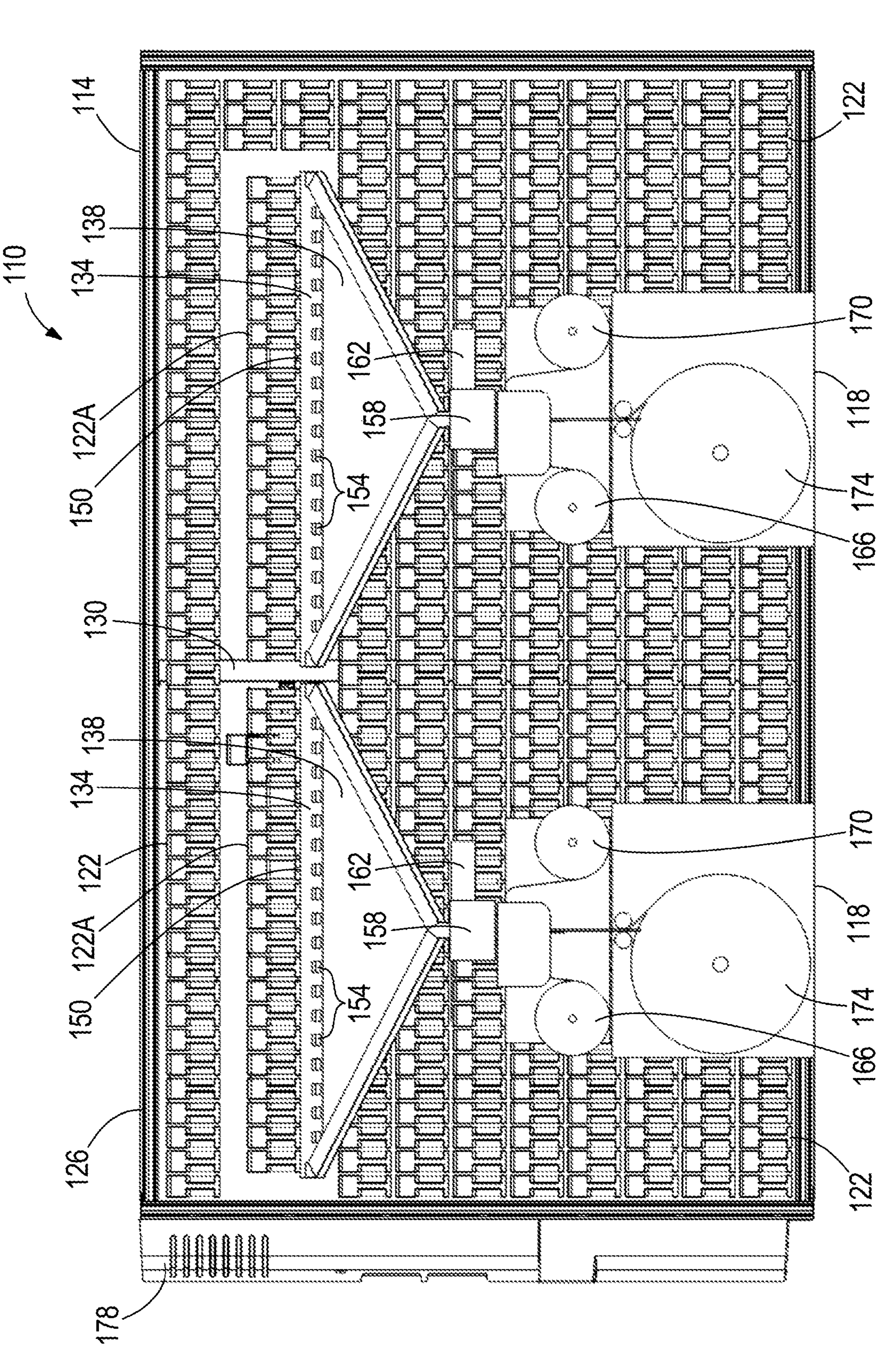
FIG. 6 is a side view of the pharmacy packaging system shown in FIG. 5.

As shown in FIG. 5, the motor bases 134 define openings 146, or inlets, in the ledge 142 that correspond to the active cassettes 122A. The motor bases 134 also include a switch 150 adjacent each opening 146. When a cassette 122A is positioned on the ledge 142, the cassette 122A communicates with the opening 146 and activates the switch 150. The switch 150 indicates to the motor base 134 that a cassette is currently positioned on the ledge 142. The motors in the motor base 134 can then open the cassette 122A (e.g., by rotating a disk on the bottom of the cassette 122A) to dispense pharmaceuticals into the opening 146. In some embodiments, an infrared beam may detect when pharmaceuticals pass through each of the openings 146. The pharmaceuticals travel through the motor base 134 and are ejected through an outlet 154 formed in a face of the motor base 134. The outlets 154 dispense the pharmaceuticals from the motor base 134 into the corresponding chute 138.

The chutes 138 direct pharmaceuticals from the motor base 134 toward packaging equipment of the corresponding packaging unit 118. The motor bases 134 are positioned generally above the packaging equipment such that pharmaceuticals slide down the chute 138 toward the packaging equipment. In the illustrated embodiment, the chutes 138 are funnels that are generally triangular and may be formed of, for example, stainless steel. In some embodiments, each chute 138 may include a cover to inhibit pharmaceuticals from bouncing out of the chute 138. In such embodiments, the cover may be formed of, for example, clear plastic to help visually monitor operation of the system 110. In addition, the cover may be easily liftable or otherwise separable from the chute 138 to facilitate cleaning the chute 138. In some embodiments, each chute 138 may include discrete tracks (e.g., raceways or pathways) to direct pharmaceuticals from the corresponding outlets 154 in the motor base 134 toward the packaging equipment.

The packaging equipment of the automatic packaging units 118 collect the pharmaceuticals from the chutes 138 and package the pharmaceuticals into pouches. In the illustrated embodiment, each packaging unit 118 includes a receptacle 158 that communicates with the corresponding chute 138. The receptacle 158 collects all of the desired pharmaceuticals from the different active cassettes 122A before delivering the pharmaceuticals in a single group to the packaging equipment. A camera 162 is coupled to the receptacle 158 to take photographs of the pharmaceuticals as the pharmaceuticals pass into the packaging equipment. In some embodiments, multiple cameras may be coupled to the receptacle 158 to take photographs of the pharmaceuticals from different reference angles. The photographs can be checked by a pharmacist remotely or on-site to verify that the correct pharmaceuticals are being packaged.

In other embodiments, a camera (or other sensor) may be positioned at each outlet 154 in the motor base 134. In such embodiments, the camera can look at a pill from its origin and determine whether the correct pharmaceutical is being dispensed by comparing an image of the pharmaceutical to a stored image of the expected pharmaceutical. For example, the camera can compare a pill's color, contour, shape, size, and/or inscription to the color, contour, shape, size, and/or inscription of a known pill.

In the illustrated embodiment, the packaging equipment of each packaging unit 118 includes two feed stock rolls 166, 170 and a take-up roll 174. After the pharmaceuticals pass through the receptacle 158, the pharmaceuticals are sandwiched between two strips of material (e.g., plastic) from the feed stock rolls 166, 170. The strips of material are then heat sealed together to form a pouch for the pharmaceuticals. In some embodiments, such as the embodiment shown in FIGS. 10-15 and described below, each receptacle 158 may include a shutter or valve mechanism that temporarily stops the pharmaceuticals before they are captured in a pouch. Once formed, the pouches are wrapped around the take-up roll 174 to create a single spool of pouches. In some embodiments, a camera (or other sensor) may be positioned upstream of the take-up roll 174 to verify, for example, that the correct number of pharmaceuticals are packaged within each pouch. The spool may correspond to pharmaceuticals requested by a particular patient or a particular facility. In other embodiments, the pouches may be cut and separated as they are filled, rather than spooled onto the take-up roll 174 continuously.

In some embodiments, the packaging units 118 may include equipment for packaging pharmaceuticals in a blister pack or card, rather than a pouch. Alternatively, the packaging units 118 may include equipment for packaging pharmaceuticals in a pharmacy vial. In such embodiments, the feed stock rolls 166, 170 and the take-up roll 174 may be removed and replaced with other suitable packaging equipment. Furthermore, the packaging system 110 may include a variety of different packaging units 118 to package the pharmaceuticals into a combination of pouches, blister cards, and/or pharmacy vials.

In some embodiments, each packaging unit 118 may include a printer to print a patient's name, the date, the amount and type of pharmaceuticals contained within, a bar code, and/or other indicia on the pouches as the pouches are formed. The printer may be, for example, a thermal printer. In other embodiments, the printer may include an ink ribbon or an ink jet. In addition, each packaging unit 118 may include a bar code scanner or vision system to monitor and check the pouches as they are spooled onto the take-up roll 174 or cut.

In some embodiments, the packaging units 118 may include rollers, castors, or other types of wheels. The wheels allow a user to roll the packaging units 118 toward and away from the storage unit 114 in a modular fashion. In the illustrated embodiment, the packaging units 118 can be easily connected to the storage unit 114 by aligning the motor bases 134 with designated areas of the frame 126. When the units 114, 118 are connected, a single control system can communicate with the storage unit 114 to control operation of the gantry assembly 130 and with the packaging units 118 to control operation of the packaging equipment. Such an arrangement allows the packaging units 118 to be quickly exchanged to package pharmaceuticals in different types and/or sizes of pouches or for maintenance.

The illustrated packaging system 110 includes a control system that functions in a similar manner to the control system 50 discussed above. A user can interact with the packaging system 110 through the control system to input patient information, facility information, and/or the pharmaceuticals needed. The control system can control movement of the gantry assembly 130 to move cassettes 122 from the shelves of the storage unit 114 to one of the motor bases 134. In addition, the control system can control operation of the motor bases 134 to selectively open and close the active cassettes 122A. Furthermore, the control system may optimize orders by minimizing movement of the gantry assembly 130 and cassettes 122 or by filling all the orders for a particular patient or facility consecutively.

Figure 8:
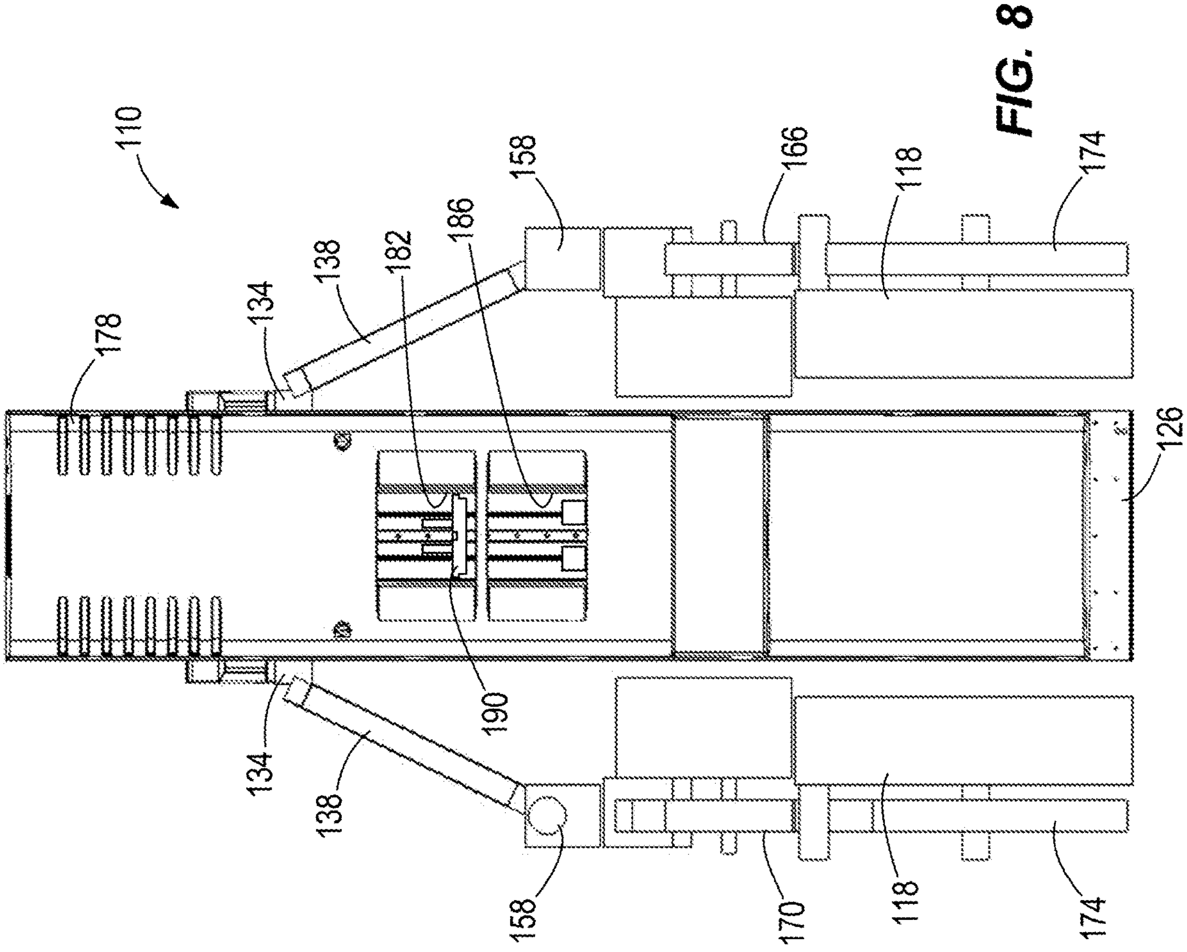
FIG. 8 is a front view of the pharmacy packaging system shown in FIG. 5.
Figure 9:
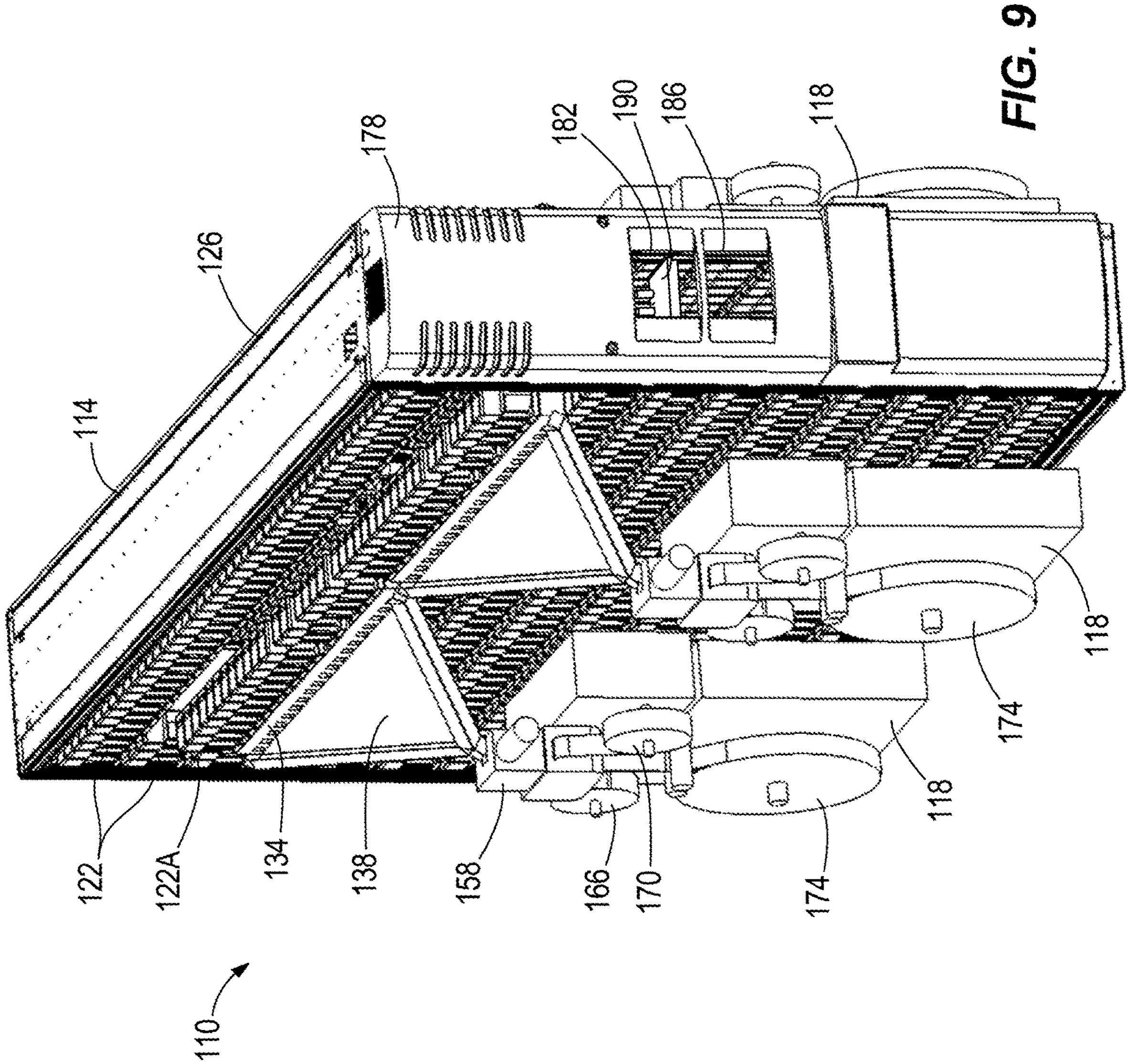
FIG. 9 is a front perspective view of the pharmacy packaging system shown in FIG. 5.

As shown in FIGS. 8 and 9, the packaging system 110 also includes a refill unit 178 coupled to the storage unit 114. The refill unit 178 includes an input port 182 and an output port 186. When a cassette 122 is empty, the gantry assembly 130 can move the cassette 122 to the output port 186. The control system may notify a user that a cassette is in the output port 186 with an audible noise, email, or other alert. The user can then remove the cassette 122 from the output port 186, fill the cassette 122 with suitable pharmaceuticals, and return the filled cassette 122 to the system through the input port 182. The illustrated input port 182 includes a scale 190 that weighs the filled cassette 122 to determine how many pharmaceuticals were added to the cassette 122. In some embodiments, the refill unit 178 may also include bar code scanners that automatically scan the cassette 122 as it is removed from and returned to the system 110. Such an arrangement limits the number of cassettes being removed from the system 110 at a time to reduce the possibility of refilling error. In addition, such an arrangement allows a user to easily access any of the cassettes 122 within the system 110 without having to use a ladder or stool to reach the top row of cassettes.

In other embodiments, a particular area (e.g., a portion of some rows and/or columns) within the storage unit 114 may be designated as the refill area. In such embodiments, the gantry assembly 130 may move empty cassettes 122 to this area for refilling by a user. When a filled cassette is placed in the refill area, a user may interact with the control system to notify the system 110 of the location of the filled cassette and the type/number of pharmaceuticals contained therein. The gantry assembly 130 may carry the cassette from the refill area to its proper location within the storage unit 114.

In some embodiments, one motor base 134, one chute 138, and one packaging unit 118 may operate together as a standalone packaging system. Such a system has a relatively small footprint for use in lower volume pharmacies or facilities. In these embodiments, a user may manually place and remove cassettes 122 on the motor base 134, as needed, to package pharmaceuticals using the packaging unit 118. In addition, the motor base 134 may be moved relatively lower and/or divided into multiple rows to facilitate access by a user.

FIGS. 10-15 illustrate another embodiment of a packaging unit 218 for use with the packaging system 110. Similar to the packaging unit 118 discussed above, the illustrated packaging unit 218 includes a motor base 222, a chute 226, a receptacle 230, two feed stock rolls 234, 238, and a take-up roll 242.

Figure 10:
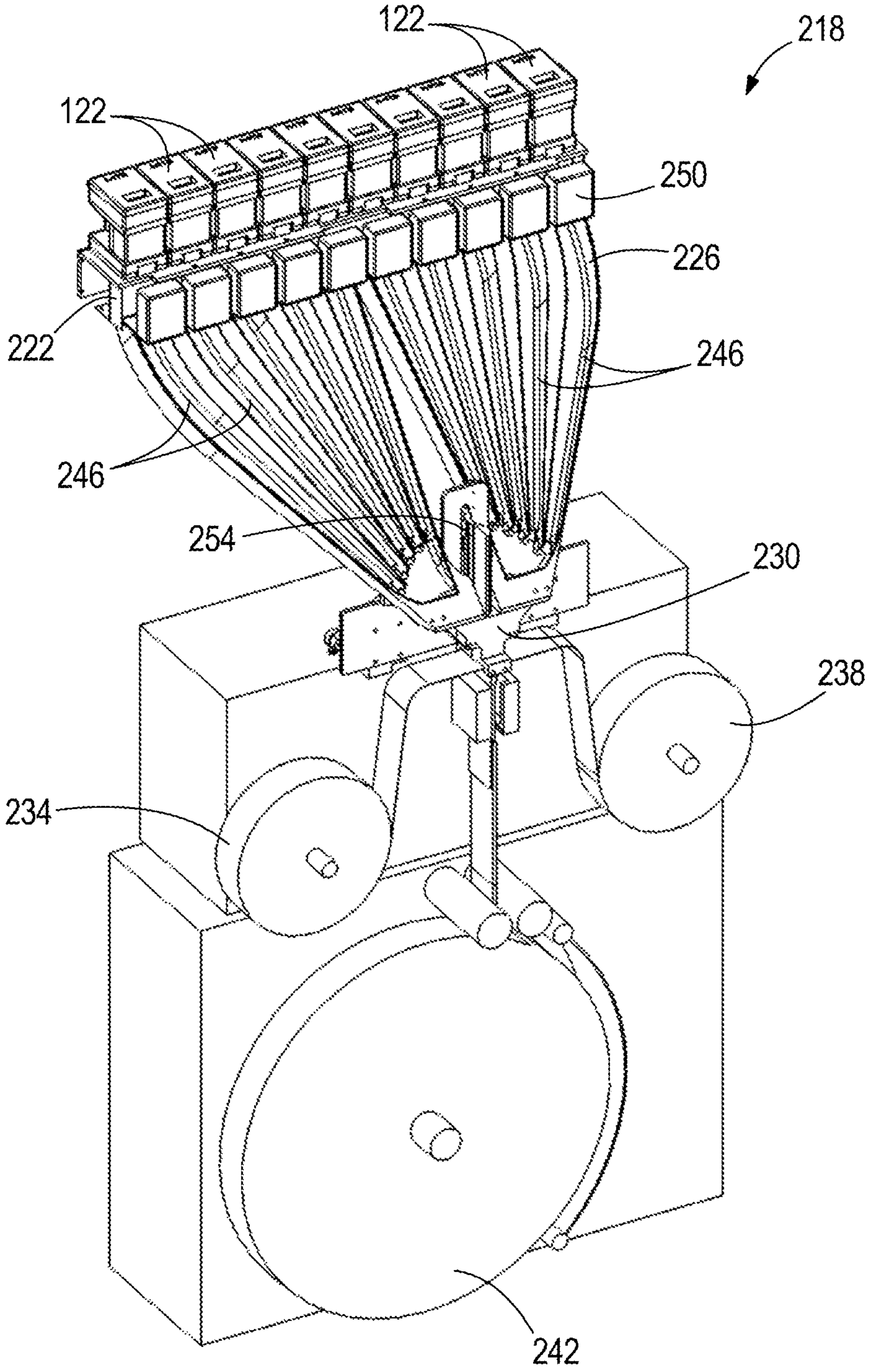
FIG. 10 illustrates another embodiment of a packaging unit for use with the packaging system shown in FIG. 5.
Figure 11:
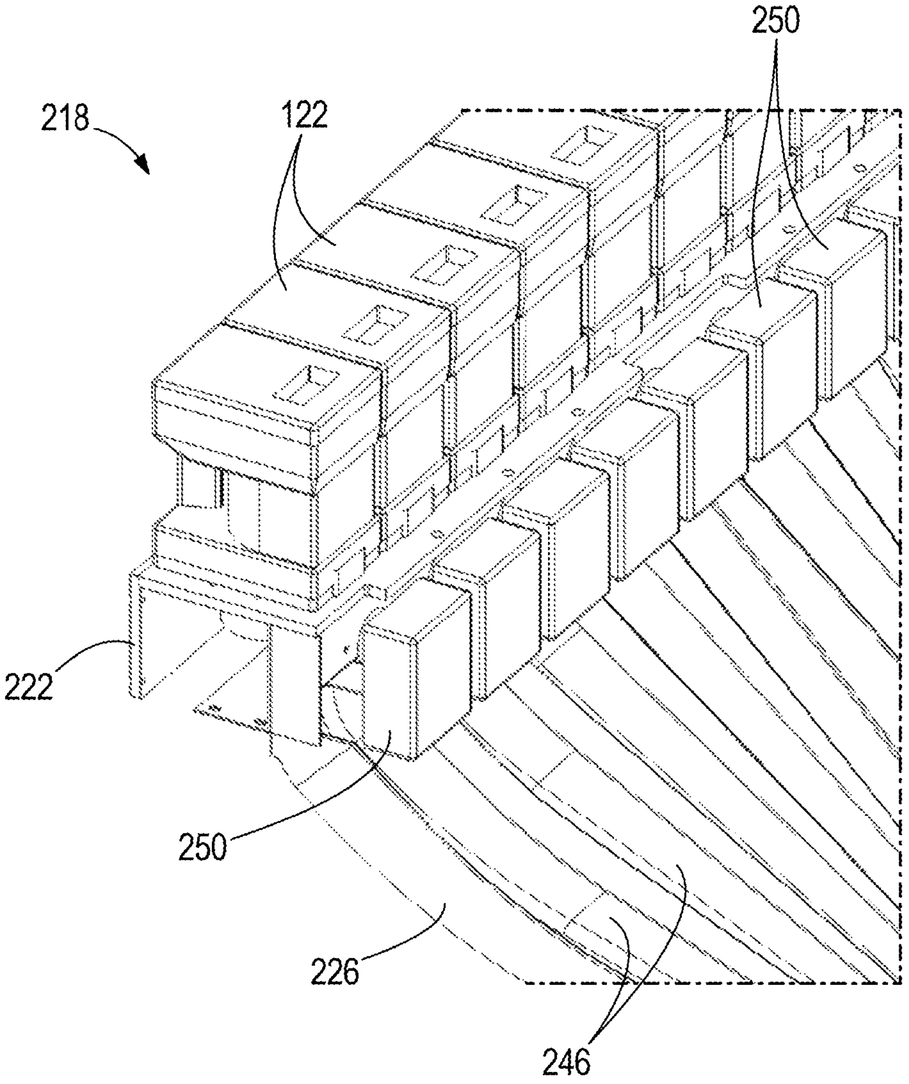
FIGS. 11 and 12 illustrate a portion of the packaging unit of FIG. 10 including a motor base and a chute.
Figure 12:
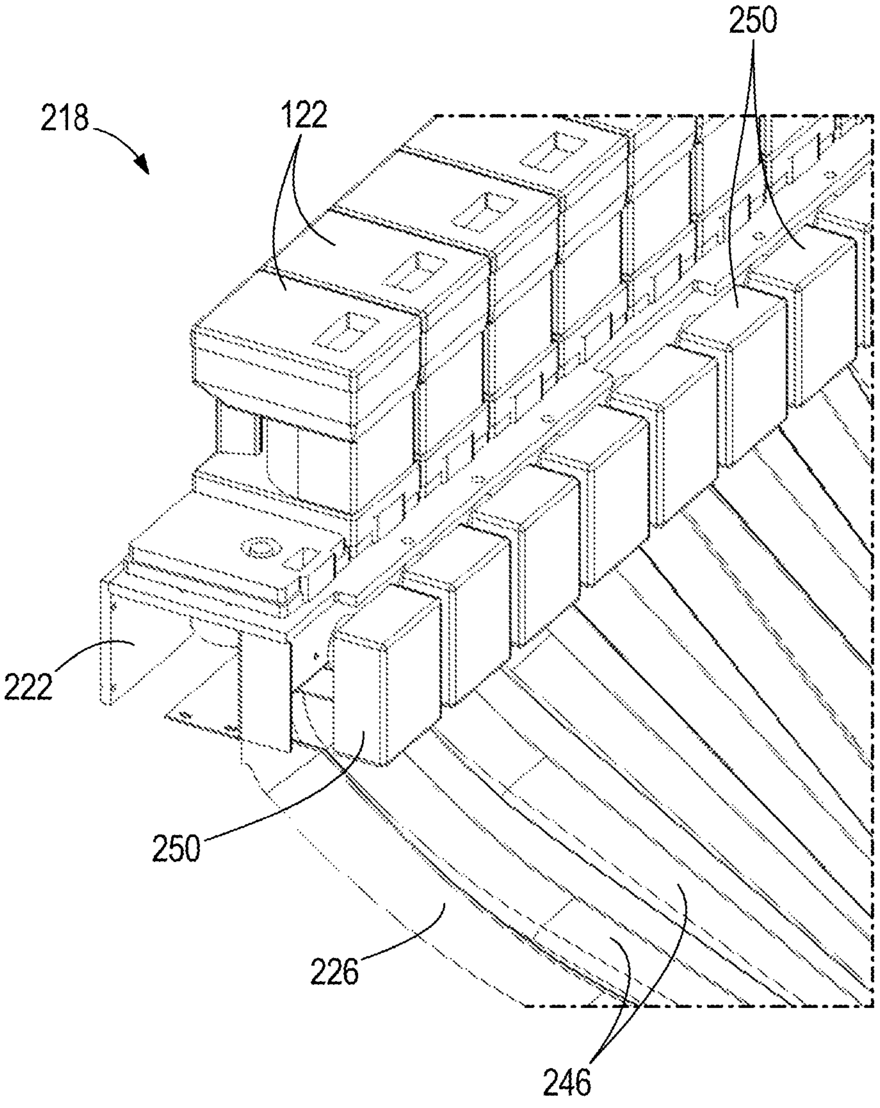

As shown in FIGS. 10-12, the chute 226 includes a plurality of discrete tracks 246 corresponding to each of the cassettes 122 mounted on the motor base 222. The illustrated tracks 246 are independent channels that together form the chute 226. The tracks 246 isolate the pharmaceuticals from each other as the pharmaceuticals slide down the chute to the receptacle.

As shown in FIGS. 11 and 12, cameras 250 are mounted to the motor base 222 adjacent outlets in the base 222. Each camera 250 is associated with one of the cassettes 122 supported on the base 222. The cameras 250 are operable to determine whether the proper number and/or type of pharmaceuticals are being dispensed from the cassettes 122. The cameras 250 capture images of pharmaceuticals exiting the motor base 222 and compare features (e.g., color, contour, size, shape, inscription, etc.) of the pharmaceuticals to stored images of known pharmaceuticals. In some embodiments, recognition software may be employed to automatically compare the images captured by the cameras 250 to stored images. In other embodiments, the captured images may be transmitted to a remotely-located pharmacist or technician who analyzes the images and verifies that the correct number and type of pharmaceuticals were dispensed.

Figure 13:
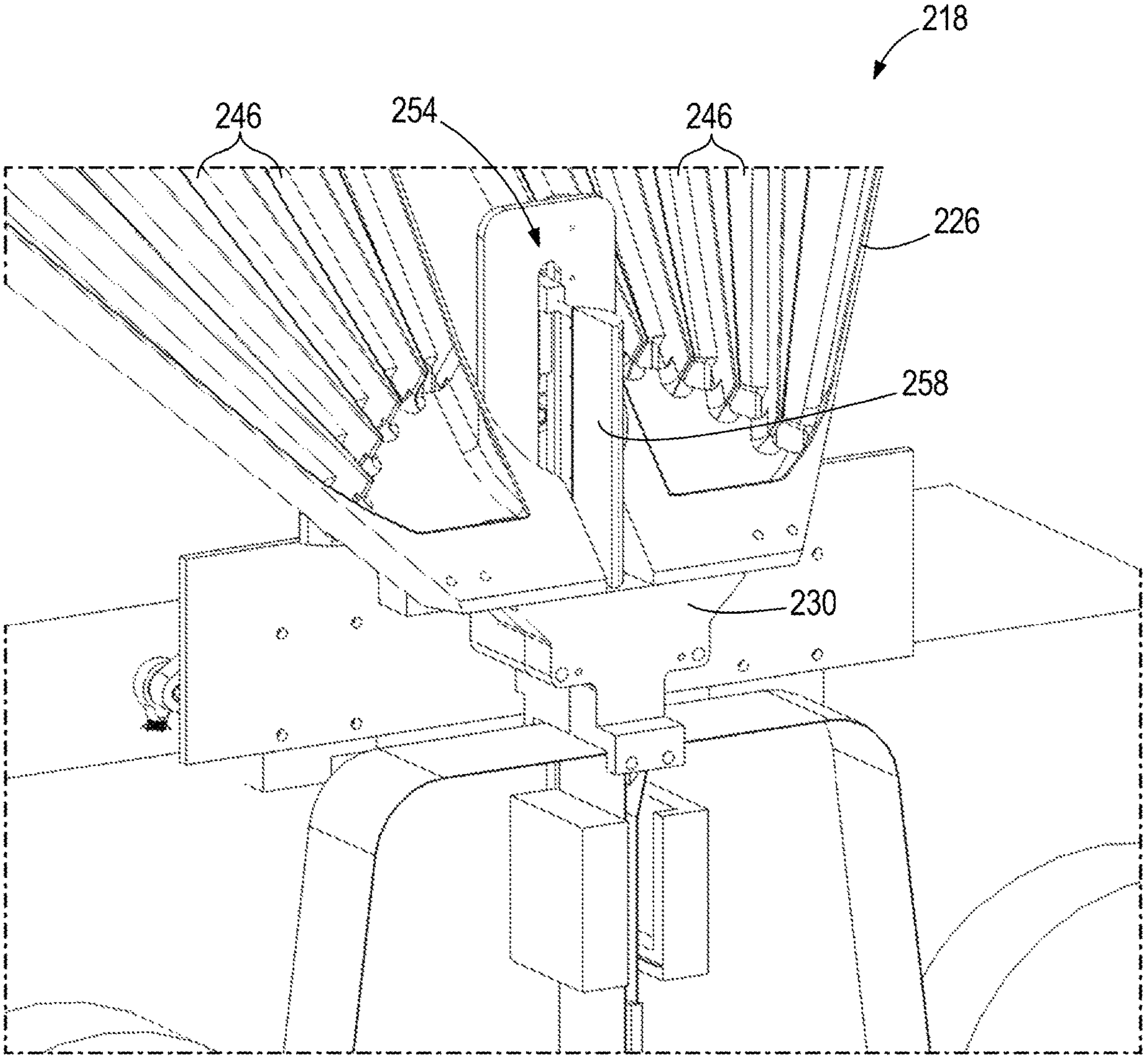
FIGS. 13-15 illustrate another portion of the packaging unit of FIG. 10 including the chute, a receptacle, and a valve mechanism.
Figure 14:
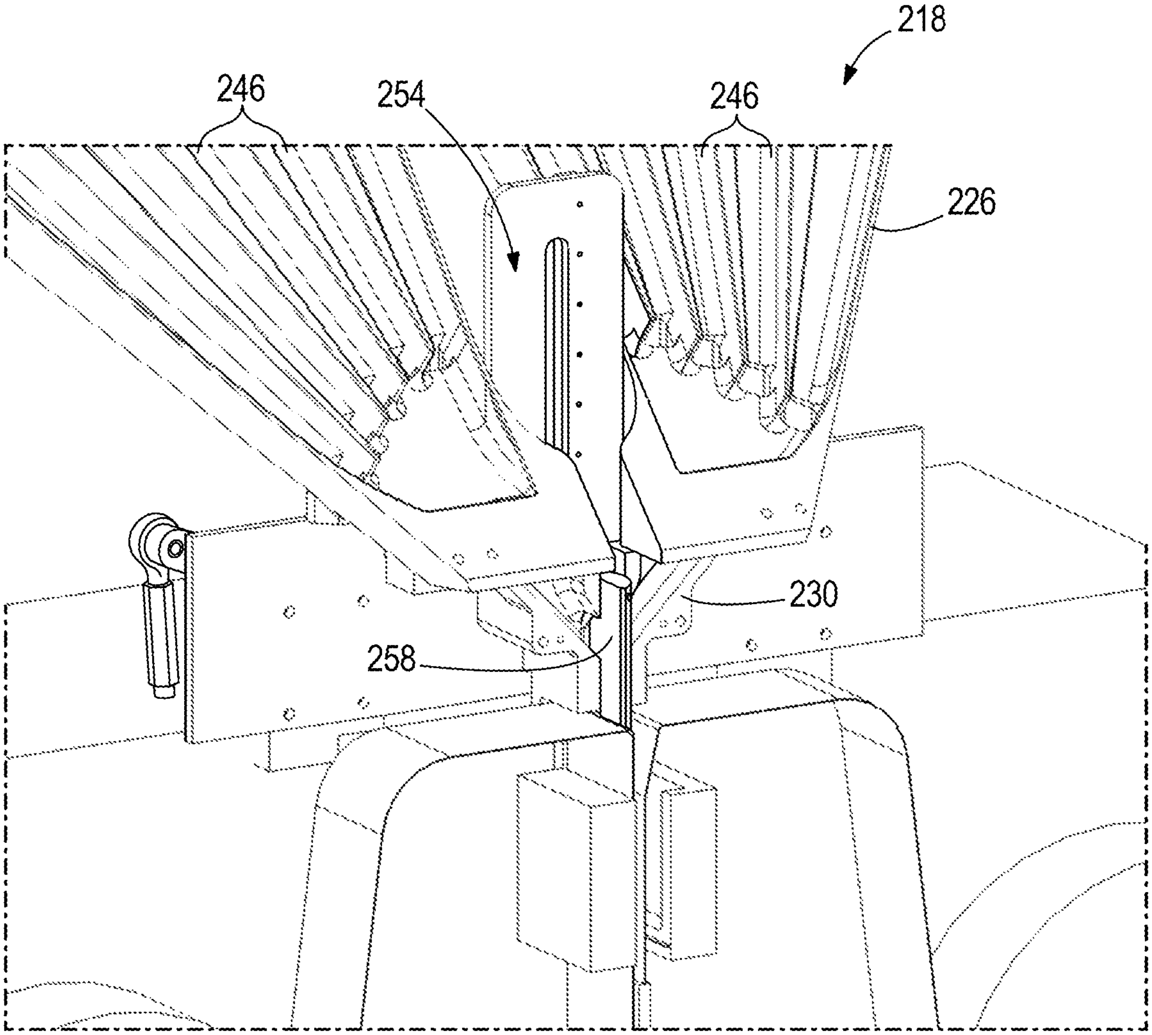
Figure 15:
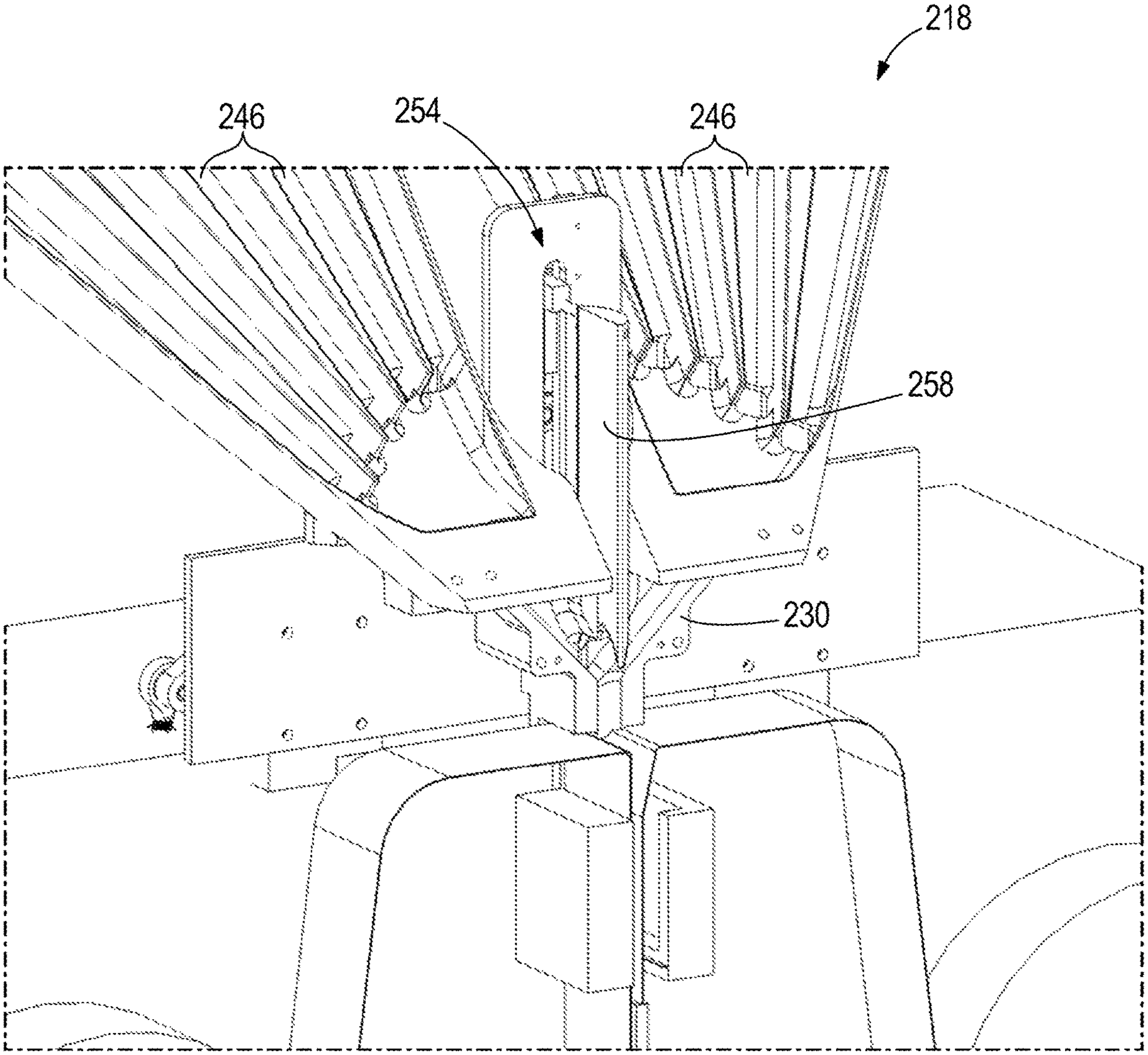

As shown in FIGS. 13-15, the receptacle 230 receives the pharmaceuticals from each of the tracks 246 in the chute 226. In the illustrated embodiment, the receptacle 230 includes a shutter or valve mechanism 254 that temporarily stops the pharmaceuticals before the pharmaceuticals are collected in a pouch by the feed stock rolls 234, 238. The illustrated shutter mechanism 254 includes a finger 258 that is movable between a first or lowered position (FIG. 14) and a second or raised position (FIG. 15). When in the lowered position, the finger 258 blocks the pharmaceuticals from traveling out of the chute 226. When in the raised position, the finger 258 is moved out of the way to allow the pharmaceuticals to pass toward the packaging equipment (e.g., the feed stock rolls 234, 238). In some embodiments, the shutter mechanism 254 may include a solenoid or other suitable actuator to raise and lower the finger 258.

In operation, the finger 258 is initially in the lowered position (FIG. 14) to temporarily stop the pharmaceuticals. The finger 258 remains in this position until all the requested pharmaceuticals are gathered in the receptacle 230. If an excess or incorrect pharmaceutical is dispensed from the cassettes 122 (which may be determined by the cameras 250), a gust of air or deflector may be employed to remove that pharmaceutical from the receptacle 230 or from the chute 226 before the pharmaceutical reaches the receptacle 230. Once the proper pharmaceuticals are within the receptacle 230, the finger 258 is actuated to the raised position (FIG. 15) such that the pharmaceuticals can be packaged in a pouch. The finger 258 is then re-actuated to the lowered position to help push the pharmaceuticals into the pouch and await the next batch of pharmaceuticals.

Figure 16:
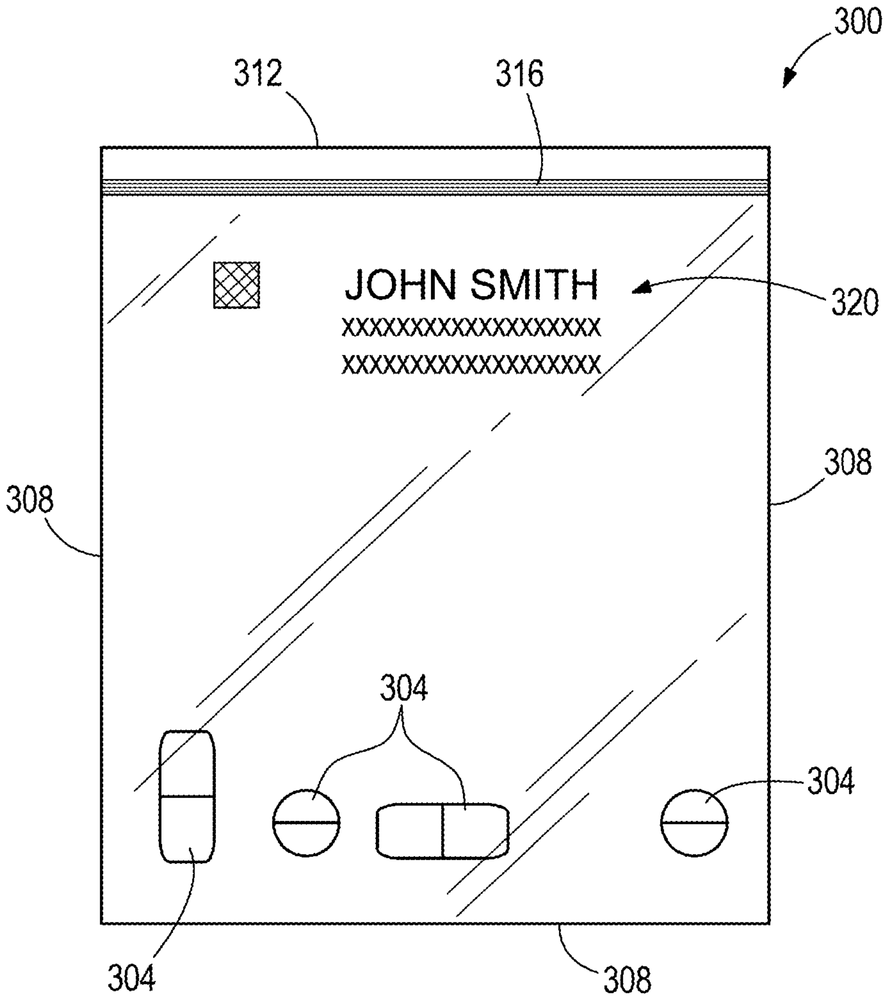
FIG. 16 illustrates a pouch with pharmaceuticals packaged inside.

FIG. 16 illustrates a pouch 300 containing different pharmaceuticals 304 therein. The illustrated pouch 300 is an example of a pouch that may be formed using the packaging equipment of the packaging units 18, 118, 218 described above. The pouch 300 is a clear plastic bag having three closed edges 308 and an open edge 312. A heat seal 316 extends across the pouch 300 adjacent the open edge 312 to seal the pouch 300. In some embodiments, all four edges 308, 312 of the pouch 300 may be closed via heat seals. Additionally or alternatively, the pouch 300 may be composed of an opaque and/or non-plastic material. As discussed above, identification indicia 320 (e.g., a patient's name, a barcode, types of pharmaceuticals, etc.) are printed on the pouch 300 using a thermal printer. In other embodiments, the identification indicia 320 may be printed on a label that is coupled to the pouch 300 with adhesives.

Various features and advantages of the invention are set forth in the following claims.

The invention claimed is:

1. A packaging unit for packaging pharmaceuticals into pouches, the packaging unit comprising:

a dispensing area to receive cassettes that contain pharmaceuticals;

packaging equipment in communication with the dispensing area, the packaging equipment including a feed stock roll for forming pouches;

a chute connecting the dispensing area to the packaging equipment; and a receptacle supported by the packaging equipment between the chute and the feed stock roll, wherein the receptacle directs the pharmaceuticals received from the chute into the pouches formed by the feed stock roll, and wherein the receptacle includes a finger movable longitudinally between a lowered position and a raised position, wherein the finger is actuated to the raised position to allow the pharmaceuticals to pass through to the pouch, and wherein the finger is re-actuated to the lowered position to push the pharmaceuticals into the pouch.

2. The packaging unit of claim 1, wherein the dispensing area includes a motor base including a motor configured to selectively open the cassettes to dispense pharmaceuticals.

3. The packaging unit of claim 2, further comprising a control system coupled to the motor to control operation of the motor.

4. The packaging unit of claim 1, wherein the feed stock roll of the packaging equipment is a first feed stock roll, wherein the packaging equipment includes a second feed stock roll, and wherein the first and second feed stock rolls together form the pouches.

5. The packaging unit of claim 1, wherein the packaging equipment further includes a take-up roll, wherein the packaging equipment is operable to spool the pouches on the take-up roll after the pouches are filled.

6. The packaging unit of claim 1, wherein the finger remains in the lowered position until all requested pharmaceuticals are gathered in the receptacle.

7. The packaging unit of claim 6, wherein the finger is actuated to the raised position when all requested pharmaceuticals are gathered in the receptacle such that the pharmaceuticals can be packaged in the pouches.

8. The packaging unit of claim 1, wherein the packaging unit includes a camera coupled to the receptacle, and wherein the camera is operable to capture an image of the pharmaceuticals within the receptacle.

9. The packaging unit of claim 1, wherein the dispensing area includes a plurality of outlets, and wherein each outlet is associated with one of the cassettes supported on the dispensing area.

10. The packaging unit of claim 9, further comprising a plurality of sensors, wherein each sensor is positioned adjacent one of the plurality of outlets to capture an image of the pharmaceuticals being dispensed from the associated cassette.

11. A packaging unit for packaging pharmaceuticals into pouches, the packaging unit comprising:

dispensing area to receive cassettes that contain pharmaceuticals;

packaging equipment in communication with the dispensing area, the packaging equipment including a feed stock roll for forming pouches;

a chute connecting the dispensing area to the packaging equipment;

a receptacle supported by the packaging equipment between the chute and the feed stock roll, wherein the receptacle directs the pharmaceuticals received from the chute into the pouches formed by the feed stock roll; and a control system coupled to the packaging equipment to control operation of the packaging equipment, wherein the control system is configured to detect that an excess or incorrect pharmaceutical is dispensed from the plurality of cassettes; and remove the excess or incorrect pharmaceutical from the receptacle.

12. The packaging unit of claim 11, wherein the excess or incorrect pharmaceutical is removed using one or more selected from a group consisting of a gust of air and a deflector.

13. The packaging unit of claim 11, wherein the dispensing area includes a motor base including a motor configured to selectively open the cassettes to dispense pharmaceuticals.

14. The packaging unit of claim 13, wherein the control system is coupled to the motor and is further configured to control operation of the motor.

15. The packaging unit of claim 11, wherein the feed stock roll of the packaging equipment is a first feed stock roll, wherein the packaging equipment includes a second feed stock roll, and wherein the first and second feed stock rolls together form the pouches.

16. The packaging unit of claim 11, wherein the packaging equipment further includes a take-up roll, wherein the packaging equipment is operable to spool the pouches on the take-up roll after the pouches are filled.

17. The packaging unit of claim 11, wherein the packaging unit includes a camera coupled to the receptacle, and wherein the camera is operable to capture an image of the pharmaceuticals within the receptacle.

18. The packaging unit of claim 11, wherein the dispensing area includes a plurality of outlets, and wherein each outlet is associated with one of the cassettes supported on the dispensing area.

19. The packaging unit of claim 18, further comprising a plurality of sensors, wherein each sensor is positioned adjacent one of the plurality of outlets to capture an image of the pharmaceuticals being dispensed from the associated cassette.

20. A packaging unit for packaging pharmaceuticals into pouches, the packaging unit comprising:

dispensing area to receive cassettes that contain pharmaceuticals;

packaging equipment in communication with the dispensing area, the packaging equipment including a feed stock roll for forming pouches;

a chute connecting the dispensing area to the packaging equipment;

a receptacle supported by the packaging equipment between the chute and the feed stock roll, wherein the receptacle directs the pharmaceuticals received from the chute into the pouches formed by the feed stock roll, wherein the receptacle includes a finger movable longitudinally between a lowered position and a raised position, wherein the finger is actuated to the raised position to allow the pharmaceuticals to pass through to the pouch, and wherein the finger is re-actuated to the lowered position to push the pharmaceuticals into the pouch; and a control system coupled to the packaging equipment to control operation of the packaging equipment, wherein the control system is configured to detect that an excess or incorrect pharmaceutical is dispensed from the plurality of cassettes, and remove the excess or incorrect pharmaceutical from the receptacle.

* * * * *